United States Patent
Ookawa

(10) Patent No.: US 10,031,211 B2
(45) Date of Patent: Jul. 24, 2018

(54) RADAR APPARATUS MOUNTED ON A VEHICLE

(71) Applicant: DENSO CORPORATION, Kariya, Aichi-pref. (JP)

(72) Inventor: Kunihiko Ookawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 174 days.

(21) Appl. No.: 14/766,733

(22) PCT Filed: Feb. 5, 2014

(86) PCT No.: PCT/JP2014/052689
§ 371 (c)(1),
(2) Date: Aug. 7, 2015

(87) PCT Pub. No.: WO2014/123162
PCT Pub. Date: Aug. 14, 2014

(65) Prior Publication Data
US 2015/0378008 A1 Dec. 31, 2015

(30) Foreign Application Priority Data

Feb. 8, 2013 (JP) .................................. 2013-023544

(51) Int. Cl.
*G01S 7/35* (2006.01)
*G01S 13/34* (2006.01)
*G01S 13/93* (2006.01)

(52) U.S. Cl.
CPC .............. *G01S 7/352* (2013.01); *G01S 13/34* (2013.01); *G01S 13/931* (2013.01); *G01S 2007/358* (2013.01)

(58) Field of Classification Search
CPC ........ G01S 7/354; G01S 13/345; G01S 13/42; G01S 13/726; G01S 13/931

(Continued)

(56) References Cited

U.S. PATENT DOCUMENTS 6,229,474 B1 * 5/2001 Uehara ................... G01S 7/354
342/109
7,295,148 B2 * 11/2007 Fukute ................... G01S 7/354
342/107

(Continued)

FOREIGN PATENT DOCUMENTS

JP    2000-338229 A    12/2000
JP    2005-134266 A     5/2005

(Continued)

OTHER PUBLICATIONS

International Preliminary Report on Patentability; International Application No. PCT/JP2014/052689; Filed: Feb. 5, 2014 (with English translation).

(Continued)

*Primary Examiner* — Peter M Bythrow
(74) *Attorney, Agent, or Firm* — Knobbe, Martens, Olson & Bear, LLP

(57) ABSTRACT

A radar apparatus which includes a transmitting unit, a receiving unit, an I signal generating circuit, a Q signal generating circuit, a peak detecting circuit, a target detecting unit, and a distortion judging unit. The transmitting unit transmits a radar wave which is frequency-modulated along a time axis in a specified cycle, and the receiving unit receives an incoming wave which is a reflected wave of the radar wave transmitted by the transmitting means and amplifies it in an amplifier. The I signal generating circuit generates an I signal which is a real number component of a beat signal by mixing the incoming wave received and amplified by the receiving means with the radar wave transmitted by the transmitting unit. The Q signal generating circuit generates a Q signal which is an imaginary number component of a beat signal by mixing the incoming wave received and amplified by the receiving unit with the radar wave trans- (Continued)

mitted by the transmitting unit with a phase being shifted by $\pi/2$ [rad].

4 Claims, 6 Drawing Sheets

(58) Field of Classification Search
USPC .................................................. 342/70–72
See application file for complete search history.

(56) References Cited

U.S. PATENT DOCUMENTS

| | | | | |
|---|---|---|---|---|
| 2003/0085835 | A1* | 5/2003 | Matsui | G01S 13/345 342/70 |
| 2003/0103000 | A1* | 6/2003 | Matsui | G01S 13/584 342/159 |
| 2005/0093736 | A1* | 5/2005 | Fukute | G01S 7/354 342/70 |
| 2005/0174282 | A1* | 8/2005 | Nakanishi | G01S 7/354 342/109 |
| 2007/0216567 | A1* | 9/2007 | Ikeda | G01S 7/34 342/92 |
| 2008/0186224 | A1* | 8/2008 | Ichiyanagi | G01S 13/347 342/109 |
| 2008/0187035 | A1* | 8/2008 | Nakamura | H03F 1/0288 375/232 |
| 2009/0121915 | A1* | 5/2009 | Randler | G01S 13/345 342/70 |
| 2010/0271254 | A1* | 10/2010 | Kanamoto | G01S 3/74 342/27 |
| 2011/0050481 | A1* | 3/2011 | Itoh | G01S 13/345 342/27 |
| 2012/0112951 | A1* | 5/2012 | Nakanishi | G01S 13/931 342/107 |
| 2012/0268316 | A1* | 10/2012 | Kanamoto | G01S 3/74 342/158 |
| 2013/0229297 | A1* | 9/2013 | Mukai | G01S 7/28 342/92 |

FOREIGN PATENT DOCUMENTS

| | | |
|---|---|---|
| JP | 2005-181018 A | 7/2005 |
| JP | 2008-275331 A | 11/2008 |
| JP | 2010-112937 A | 5/2010 |
| JP | 4755651 B2 | 6/2011 |
| JP | 2012-108049 A | 6/2012 |
| WO | 2014123162 A1 | 8/2014 |

OTHER PUBLICATIONS

International Search Report (translated version); International Application No. PCT/JP2014/052689, filed Feb. 5, 2014; 11 pages.

* cited by examiner

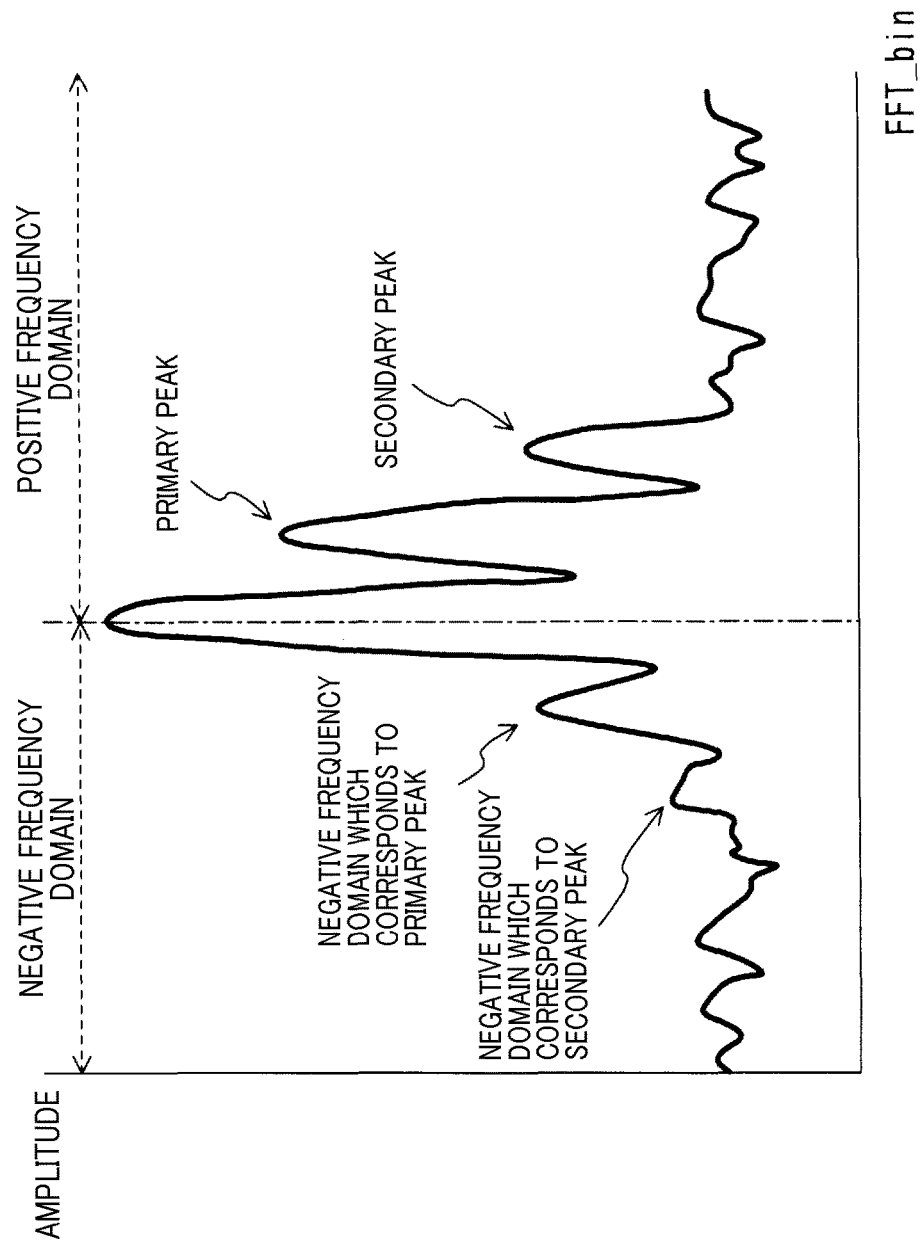

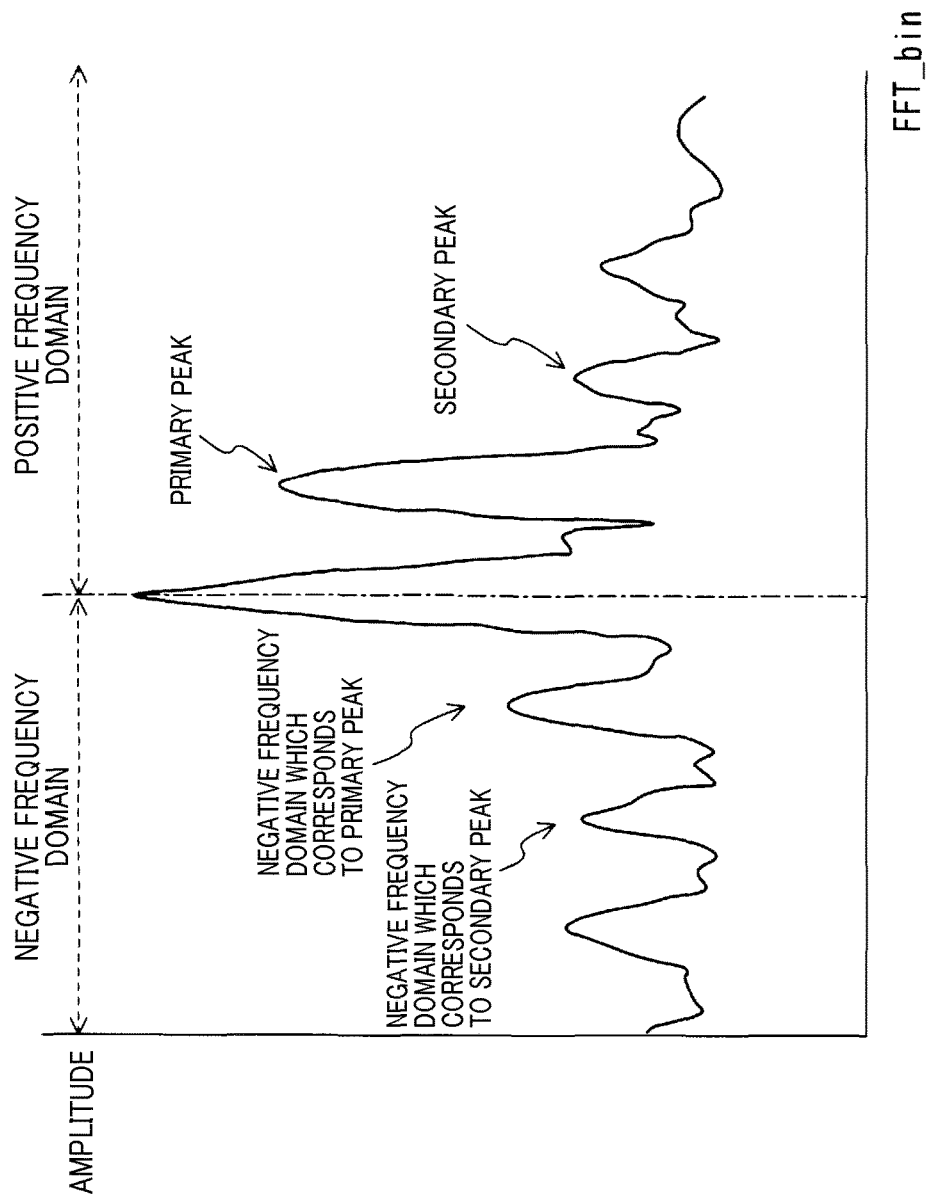

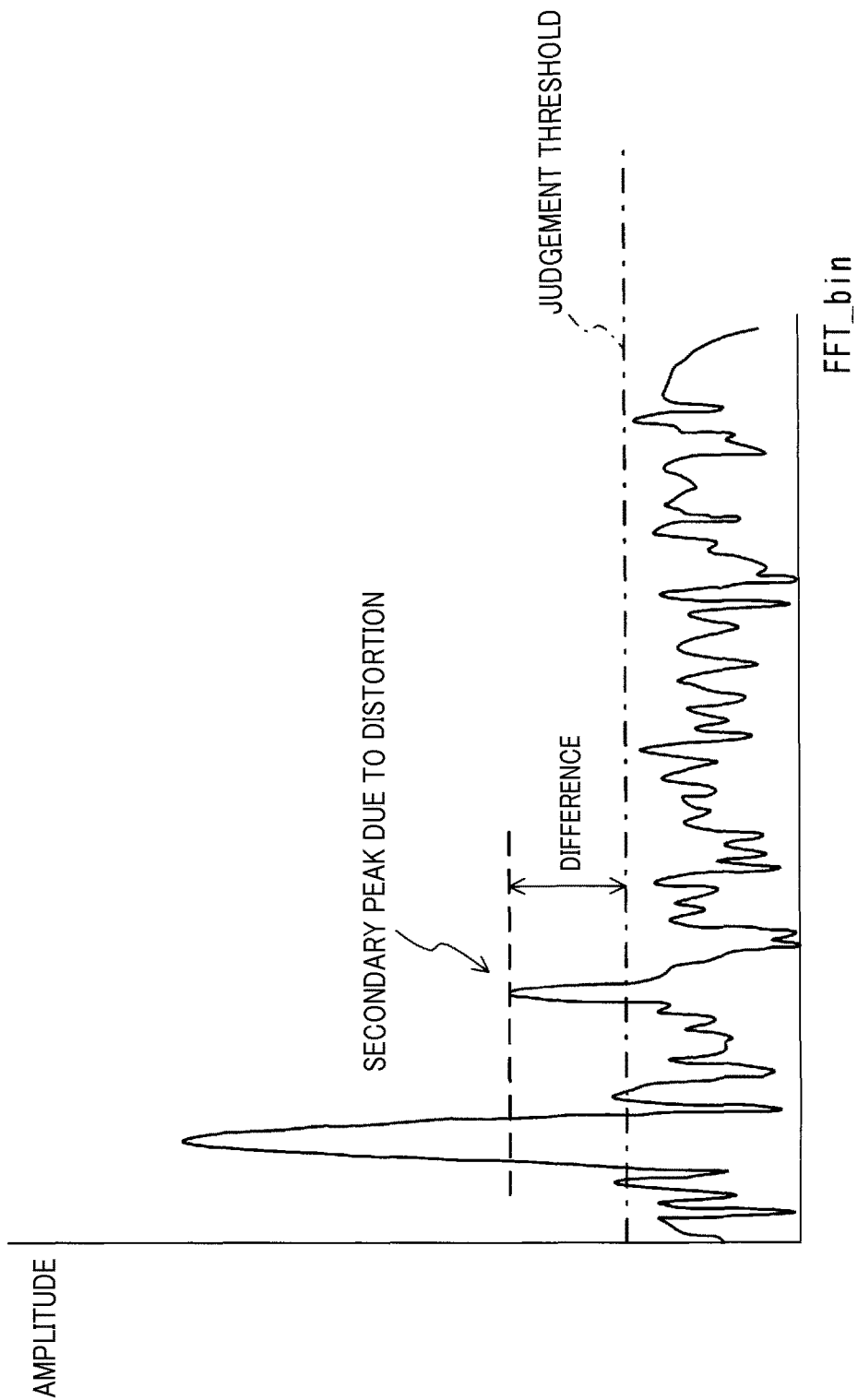

RADAR APPARATUS MOUNTED ON A VEHICLE

CROSS-REFERENCE TO RELATED APPLICATION

This application is based on and claims the benefit of priority from earlier Japanese Patent Application No. 2013-23544 filed Feb. 8, 2013, the description of which is incorporated herein by reference.

BACKGROUND

Technical Field

The present disclosure relates to a radar apparatus mounted on a vehicle, and more specifically, a radar apparatus that detects a target based on a result of frequency-analysis of a beat signal.

Background Art

Conventionally, radar apparatuses mounted on vehicles are known. Such radar apparatuses include a transmitting and receiving section that transmits and receives a radar wave and a target detecting section that detects a target based on a frequency-analysis result of the radar waves transmitted and received by the transmitting and receiving section.

The transmitting and receiving section in the radar apparatus of this type includes a transmitting section that transmits a transmission wave (that is, radar wave) modulated with a cycle which includes a rising section in which a frequency gradually increases along the time axis and a falling section in which a frequency gradually decreases along the time axis on a repeating basis, and a receiving section that receives a reflected radar wave (hereinafter, referred to as "incoming wave") via a receiving antenna, amplifies the radar wave in an amplifier circuit, and mixes the amplified incoming wave with a transmission wave in a mixer to generate a beat signal.

Then, the target detecting section analyzes the beat signal generated by the receiving section so as to detect a frequency peak (that is, target). Specifically, each of the frequencies having a maximum frequency intensity in a power spectrum, which is a frequency-analysis result of the beat signal, is detected as a frequency peak (that is, target).

Hereinafter, the above described radar apparatus is referred to as a conventional radar apparatus.

CITATION LIST

Patent Literature

[PTL 1] JP-A-2012-108049

In the conventional radar apparatus, it is assumed that a radar wave is transmitted in a traveling direction of an own vehicle, and the radar wave is reflected by a preceding vehicle which is traveling on a traveling road of the own vehicle. In this situation, the conventional radar apparatus may receive an incoming wave generated by a multiple reflection which is a reflection repeated for a plurality of times between the own vehicle (or radar apparatus) and the preceding vehicle.

A beat signal generated from the incoming wave of the multiple reflection (hereinafter, referred to as "multiple reflection signal") contains a fundamental frequency, which is a frequency component of the incoming wave which is initially reflected by the preceding vehicle, and a harmonic wave component of the fundamental frequency.

In the conventional radar apparatus, the amplifier circuit amplifies the incoming wave received via the receiving antenna before generating a beat signal. Generally, a harmonic circuit having a transistor (amplifier circuit) is used as an amplifier circuit.

Accordingly, when a distance to the target which reflects the radar wave is small, the incoming wave amplified by the amplifier circuit may be saturated and cause distortion of the waveform. A beat signal based on a signal having a distortion is hereinafter referred to as "saturated signal".

Such a saturated signal has a pulse waveform. Accordingly, in the frequency analysis by the conventional radar apparatus, a harmonic wave of the fundamental frequency is detected in addition to the fundamental frequency.

That is, in the conventional radar apparatus, a frequency-analysis of the multiple reflection signal and a frequency-analysis of the saturated signal result in similar results. Accordingly, in order to improve the detection accuracy of targets in the radar apparatus, it is needed to identify whether the frequency peak that corresponds to a harmonic wave is generated due to multiple reflection or due to the incoming wave being saturated in the amplifier circuit.

However, the conventional radar apparatus is not capable of identifying whether the frequency peak that corresponds to a harmonic wave is generated due to the incoming wave being saturated in the amplifier circuit or not.

SUMMARY

The present disclosure provides a radar apparatus which allows identification of whether the frequency peak that corresponds to a harmonic wave is generated due to the incoming wave being saturated in the amplifier circuit or not.

A radar apparatus according to the present disclosure which has been made to achieve the above object includes transmitting means, receiving means, I signal generating means, Q signal generating means, peak detecting means, target detecting means and distortion judging means.

According to the present disclosure, the transmitting means transmits a radar wave which is frequency-modulated along a time axis in a specified cycle, and the receiving means receives an incoming wave which is a reflected wave of the radar wave transmitted by the transmitting means and amplifies it in an amplifier.

Then, the I signal generating means generates an I signal which is a real number component of a beat signal by mixing the incoming wave received and amplified by the receiving means with the radar wave transmitted by the transmitting means. Further, the Q signal generating means generates a Q signal which is an imaginary number component of a beat signal by mixing the incoming wave received and amplified by the receiving means with the radar wave transmitted by the transmitting means with a phase being shifted by $\pi/2$ [rad].

Further, according to the present disclosure, the peak detecting means performs complex frequency analysis of the I signal generated by the I signal generating means and the Q signal generated by the Q signal generating means and, as a result of the complex frequency analysis, detects a frequency which becomes maximum as a frequency peak. The target detecting means detects the frequency peak detected by the peak detecting means as a target that has reflected the radar wave.

Further, according to the radar apparatus of the present disclosure, the distortion judging means at least judges whether the frequency peak is a saturation distortion, which is a distortion due to saturation of a signal waveform in the amplifier, based on a result of comparison of intensities of frequencies which correspond to the frequency peak detected in a positive frequency domain and a frequency peak detected in a negative frequency domain as a result of the complex frequency analysis performed by the peak detecting means.

That is, in the multiple reflection, the incoming wave received by the radar sensor includes the incoming wave which has been initially reflected by the preceding vehicle (which corresponds to the fundamental wave; hereinafter, referred to as "fundamental incoming wave") and the incoming wave which has been reflected for a plurality of times between the own vehicle and the preceding vehicle (which corresponds to the secondary harmonic wave; hereinafter, referred to as "secondary incoming wave"). Since the fundamental incoming wave and the secondary incoming wave are independent from each other, the phase of Q signal is delayed relative to the I signal by $\pi/2$ [rad] in the radar sensor of the present disclosure.

Accordingly, in the multiple reflection, the intensity of frequency of the fundamental incoming wave and the intensity of frequency of the secondary incoming wave in the negative frequency domain are each suppressed. As a result, when the complex frequency analysis is performed for the multiple reflection signal, the frequency peaks which correspond to each of the fundamental incoming wave and the secondary incoming wave are not detected in the negative frequency domain.

On the other hand, when the signal waveform is saturated due to amplification in the amplifier, the phase of the fundamental wave and the phase of the secondary harmonic wave cooperate with each other. Accordingly, the phase of Q signal of the fundamental wave is shifted (delayed) relative to the I signal of the fundamental wave by $\pi/2$ [rad], while the phase of Q signal of the secondary harmonic wave is shifted (delayed) relative to the I signal of the secondary harmonic wave by $\pi$ [rad]. In such a saturated signal, the intensity of frequency of the fundamental wave in the negative frequency domain is suppressed, while the intensity of frequency of the secondary harmonic wave in the negative frequency domain is not suppressed.

Accordingly, when the complex frequency analysis is performed for the saturated signal in the radar apparatus of the present disclosure, although the frequency peak which corresponds to the fundamental wave is not detected in the negative frequency domain, the frequency peak which corresponds to the secondary harmonic wave is detected.

Further, for the positive frequency domain, the frequency peaks which correspond to each of the fundamental wave and the secondary harmonic wave are detected when the complex frequency analysis is performed for the multiple reflection signal and when the complex frequency analysis is performed for the saturated signal.

Therefore, according to the radar sensor of the present disclosure, whether the frequency peak is a saturation distortion or not can be judged by comparing the intensities of frequencies which correspond to the frequency peak detected in the positive frequency domain and a frequency peak detected in the negative frequency domain. Accordingly, in the radar apparatus of the present disclosure, the detection accuracy of a target can be improved by preventing the frequency peak judged as a saturation distortion from being recognized as a target.

As described above, according to the radar apparatus of the present disclosure, when the complex frequency analysis is performed for a saturated signal, although the frequency peak which corresponds to the fundamental wave is not detected in the negative frequency domain, the frequency peak which corresponds to the secondary harmonic wave is detected.

Accordingly, in the radar apparatus of the present disclosure, a high-order peak judging means may judge whether a secondary peak which is a frequency peak that corresponds to the secondary harmonic wave when a specific frequency is taken as the fundamental frequency is present in the frequency peak detected in the positive frequency domain.

In this case, the distortion judging means of the present disclosure may judge, when the secondary peak is present as a result of judgment by the high-order peak judging means, that the secondary peak is a saturation distortion if the intensity of frequency of the frequency peak in the negative frequency domain which corresponds to the secondary peak to the intensity of frequency of the secondary peak is a predetermined specified ratio or more.

According to the above described radar apparatus, it is possible to judge that the secondary peak is a saturation distortion. Particularly, in the radar apparatus of the present disclosure, the judgment accuracy can be improved.

Further, as described above, in the radar apparatus of the present disclosure, when the complex frequency analysis is performed for the multiple reflection signal, the frequency peaks which correspond to each of the fundamental incoming wave and the secondary incoming wave are not detected in the negative frequency domain.

Accordingly, the distortion judging means of the present disclosure may judge, when the secondary peak is present as a result of judgment by the high-order peak judging means, that the secondary peak is a frequency peak due to multiple reflection if the intensity of frequency of the frequency peak in the negative frequency domain which corresponds to the secondary peak to the intensity of frequency of the secondary peak is lower than a predetermined specified ratio.

According to the above described radar apparatus, it is possible to judge that the secondary peak is a frequency peak due to multiple reflection. Particularly, in the radar apparatus of the present disclosure, the judgment accuracy can be improved.

BRIEF DESCRIPTION OF THE DRAWINGS

In the accompanying drawings:

FIG. 4 is a view which shows a result of complex frequency analysis when a multiple reflection occurs.

FIG. 5 is a view which show a result of complex frequency analysis when a signal saturation by an amplifier circuit occurs.

FIG. 6 is an explanatory view which shows a change control of an amplification factor.

DETAILED DESCRIPTION OF THE PREFERRED EMBODIMENTS

With reference to the drawings, an embodiment of the present disclosure will be described.

<General Configuration>

Figure 1:
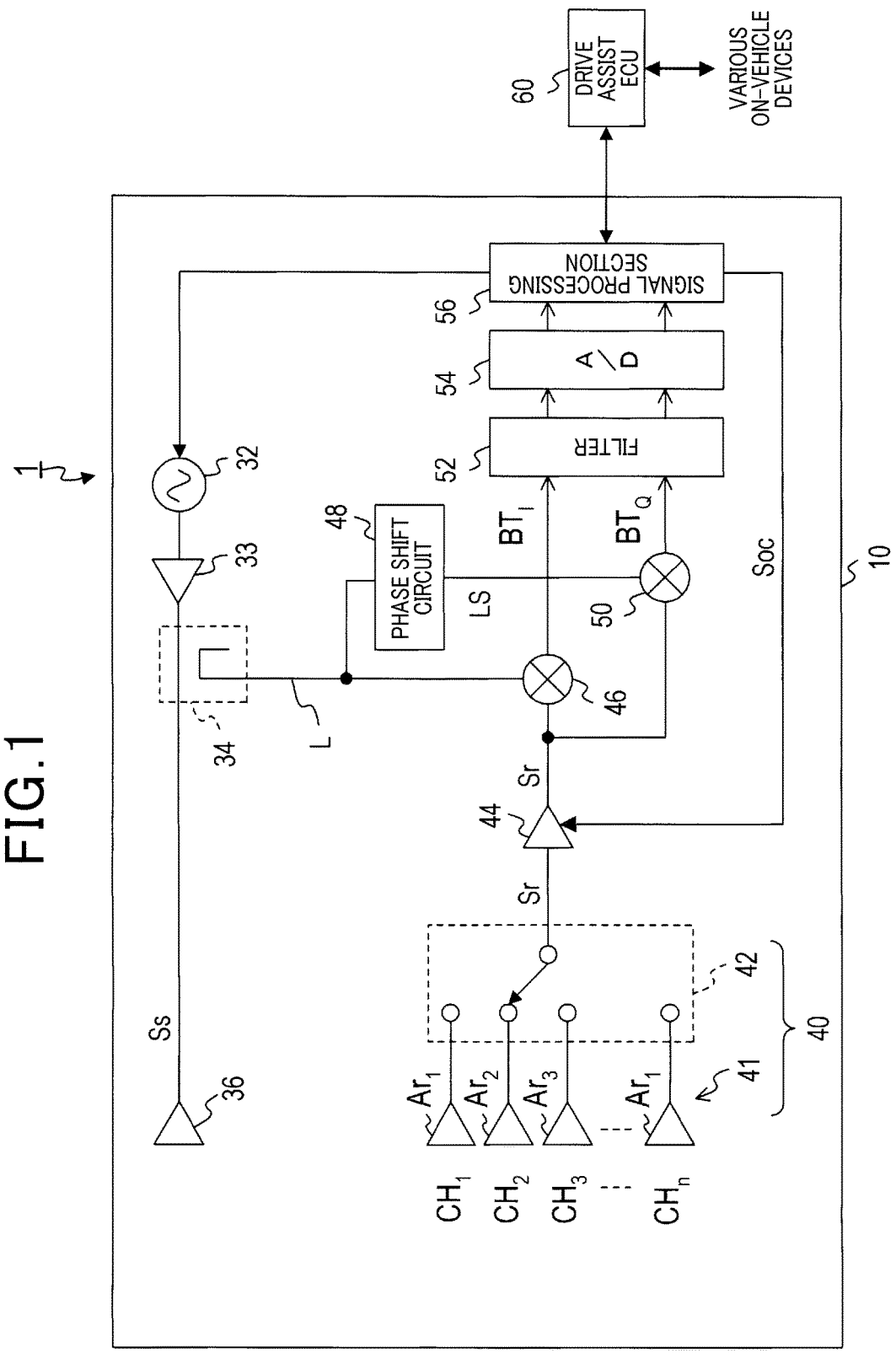
FIG. 1 is a block diagram which shows a schematic configuration of a radar apparatus to which the present disclosure is applied.

A drive assist system 1 shown in FIG. 1 is a system which implements adaptive cruise control (ACC) and pre-crash safety system (PCS), and includes a radar sensor 10 and a drive assist electronic control unit (hereinafter, referred to as "drive assist ECU") 60.

The adaptive cruise control described herein is a known control and controls an own vehicle to maintain an appropriate inter-vehicle distance between a preceding vehicle and the own vehicle. The pre-crash safety system is a known control and improves a braking force of the own vehicle and a restraining force of a seat belt.

The radar sensor 10 is configured as a so-called millimeter wave radar apparatus which uses a frequency modulated continuous wave (FMCW) method, and recognizes a target such as a preceding vehicle and a roadside object on the basis of a result of transmitted and received continuous waves in a millimeter wave band which are frequency-modulated along a time axis (hereinafter, referred to as "radar wave"). At the same time, the radar sensor 10 generates a target information regarding the recognized target and transmits it to the drive assist ECU 60. The target information contains at least a relative speed to the target and a position of the target (distance, azimuth $\theta$).

The drive assist ECU 60 is mainly configured of a known microcomputer which includes at least ROM, RAM and CPU, and includes a bus controller for performing communication at least via a LAN communication bus.

The drive assist ECU 60 is connected at least to a brake control unit, which is not shown in the figure, an engine control unit and a seat belt control unit via the LAN communication bus.

The brake control unit transmits state information (such as steering angle, yaw rate and brake state) from various sensors, which are not shown in the figure, to the drive assist ECU 60. Further, the brake control unit controls a braking force applied to the own vehicle depending on a target acceleration rate, a brake request and the like from the drive assist ECU 60, and a brake state.

The engine control unit transmits state information (that is, vehicle speed, engine control state, acceleration operation state) from various sensors to the drive assist ECU 60. Further, the engine control unit controls a drive force for an internal combustion engine or a drive system depending on the drive state based on the target acceleration rate, a fuel cut request and the like from the drive assist ECU 60.

When the seat belt control unit receives an emergency signal from the drive assist ECU 60 which indicates that the collision between the own vehicle and the target is unavoidable, it controls the restraining force of the seat belt by driving a motor, which is not shown in the figure.

The drive assist ECU 60 is connected to an alarm buzzer, a monitor, a cruise control switch, a target inter-vehicle distance setting switch and the like, which are not shown in the figure.

That is, the drive assist ECU 60 calculates a control value for appropriately maintaining the inter-vehicle distance between the preceding vehicle and the own vehicle on the basis of the setting value inputted via the cruise control switch and the target inter-vehicle setting switch and the target information received from the radar sensor 10. Then, the drive assist ECU 60 outputs the target acceleration rate, the fuel cut request and the like as the calculated control value to the engine control unit and outputs the target acceleration rate, brake request and the like as the calculated control value to the brake control unit, thereby operating the adaptive cruise control.

At the same time, the drive assist ECU 60 obtains a probability of collision between the own vehicle and the target on the basis of the target information received from the radar sensor 10. When the collision probability is a predetermined specified value or more, the drive assist ECU 60 outputs a brake request to the brake control unit to increase the braking force of the own vehicle and outputs an emergency signal to the seat belt control unit, thereby operating the pre-crash safety system.

<Radar Sensor>

The radar sensor 10 includes an oscillator 32, an amplifier 33, a divider 34 and a transmission antenna 36.

The oscillator 32 generates a high frequency signal in a millimeter wave band which is modulated to have a rising section in which the frequency linearly increases and a falling section in which the frequency linearly decreases with respect to time. The amplifier 33 amplifies the high frequency signal generated by the oscillator 32. The divider 34 power-divides an output of the amplifier 33 into a transmission signal Ss and a local signal L. The transmission antenna 36 emits a radar wave corresponding to the transmission signal Ss.

Further, the radar sensor 10 includes a receiving antenna section 40, an amplifier 44, a mixer 46, a phase shift circuit 48, a mixer 50, a filter 52, an A/D converter 54 and a signal processing section 56.

The receiving antenna section 40 includes an array antenna 41 and a receiving switch 42.

The array antenna 41 is composed of n antenna elements $Ar_i$ (n is an integer of "2" or more), and n antenna elements $Ar_i$ (n is an integer, of value 2 or higher) are arranged with an equal interval of a predetermined interval. The receiving switch 42 sequentially selects any of the antenna elements $Ar_i$ which constitute the array antenna 41, and supplies a receiving signal Sr from the selected antenna element $Ar_i$ to the amplifier 44. In this embodiment, receiving channels $CH_i$ are each allocated to the respective antenna elements $Ar_i$.

The amplifier 44 is a known amplifier, and at least includes a transistor and is configured to be capable of changing an amplification factor $\alpha$. The amplification factor $\alpha$ in the amplifier 44 is changed in response to a change command SoC from the signal processing section 56.

The mixer 46 mixes the receiving signal Sr amplified by the amplifier 44 with the local signal L divided by the divider 34 so as to generate an I signal $BT_I$ which is a real number component of beat signal.

The phase shift circuit 48 is a known circuit that shifts a phase of signal, and shifts the phase of output of the divider 34 (that is, the local signal L) by 90 degrees ($\pi/2$ [rad]). Specifically, the phase shift circuit 48 performs a phase delay as a phase shift.

The mixer 50 mixes the receiving signal Sr amplified by the amplifier 44 with a shift local signal LS having a phase shifted by the phase shift circuit 48 so as to generate a Q signal $BT_Q$ which is an imaginary component of the beat signal.

The filter 52 is a pair of filters which removes an unnecessary signal component from the I signal $BT_I$ from the mixer 46 and the Q signal $BT_Q$ from the mixer 50. The A/D converter 54 samples the I signal $BT_I$ and the Q signal $BT_Q$ which are outputted from the filter 52 and converts them into digital data.

The signal processing section 56 is mainly configured of a known microcomputer which includes at least ROM, RAM and CPU, and includes an arithmetic processing unit (for example, digital signal processor: DSP) that performs fast Fourier transform (FFT) processing and the like on the data obtained via the A/D converter 54.

The signal processing section 56 controls start and stop of the oscillator 32 and sampling of the I signal $BT_I$ and the Q signal $BT_Q$ via the A/D converter 54, and also performs a target detecting process for detecting a target that has reflected the radar wave by using the sampling data.

<Brief Summary of Radar Sensor Operation>

Next, an operation of the radar sensor 10 will be briefly described.

In the radar sensor 10, when the oscillator 32 oscillates in response to a command from the signal processing section 56, the high frequency signal generated by the oscillator 32 and amplified by the amplifier 33 is power-divided by the divider 34 so as to generate the transmission signal Ss and the local signal L. The transmission signal Ss is transmitted as the radar wave via the transmission antenna 36.

Then, the radar wave transmitted from the transmission antenna 36 and reflected by the target (that is, a reflected wave) is received by all the antenna elements $Ar_i$ which constitute the receiving antenna section 40. Then, only the receiving signal Sr of the receiving channel $CH_i$ selected by the receiving switch 42 is amplified by the amplifier 44 and supplied to the mixer 46 and the mixer 50.

The mixer 46 mixes the amplified receiving signal Sr with the local signal L from the divider 34 so as to generate the I signal $BT_I$ (that is, the real number component of beat signal). On the other hand, the mixer 50 mixes the amplified receiving signal Sr with the shift local signal LS from the phase shift circuit 48 so as to generate the Q signal $BT_Q$ (that is, the imaginary component of beat signal).

Then, the I signal $BT_I$ and the Q signal $BT_Q$ are sampled by the A/D converter 54 after the unnecessary signal component is removed by the filter 52, and is taken into the signal processing section 56.

The receiving switch 42 is switched so that the channel $CH_i$ among all the receiving channels $CH_1$ is selected at a predetermined number of times (for example, 1024 times) during one modulation cycle of the radar wave. Further, the A/D converter 54 performs sampling in synchronization with this switching timing. That is, during one modulation cycle of the radar wave, the sampling data for a predetermined number of times (for example, 512 times) are accumulated for each of the respective receiving channels $CH_1$ to $CH_i$ and for each of the rising section and falling section of the radar wave.

<Target Detecting Process>

Next, the target detecting process performed by the signal processing section 56 of the radar sensor 10 will be described.

The target detecting process performed by the signal processing section 56 starts at a predetermined specified time interval (that is, a measurement cycle).

Figure 2:
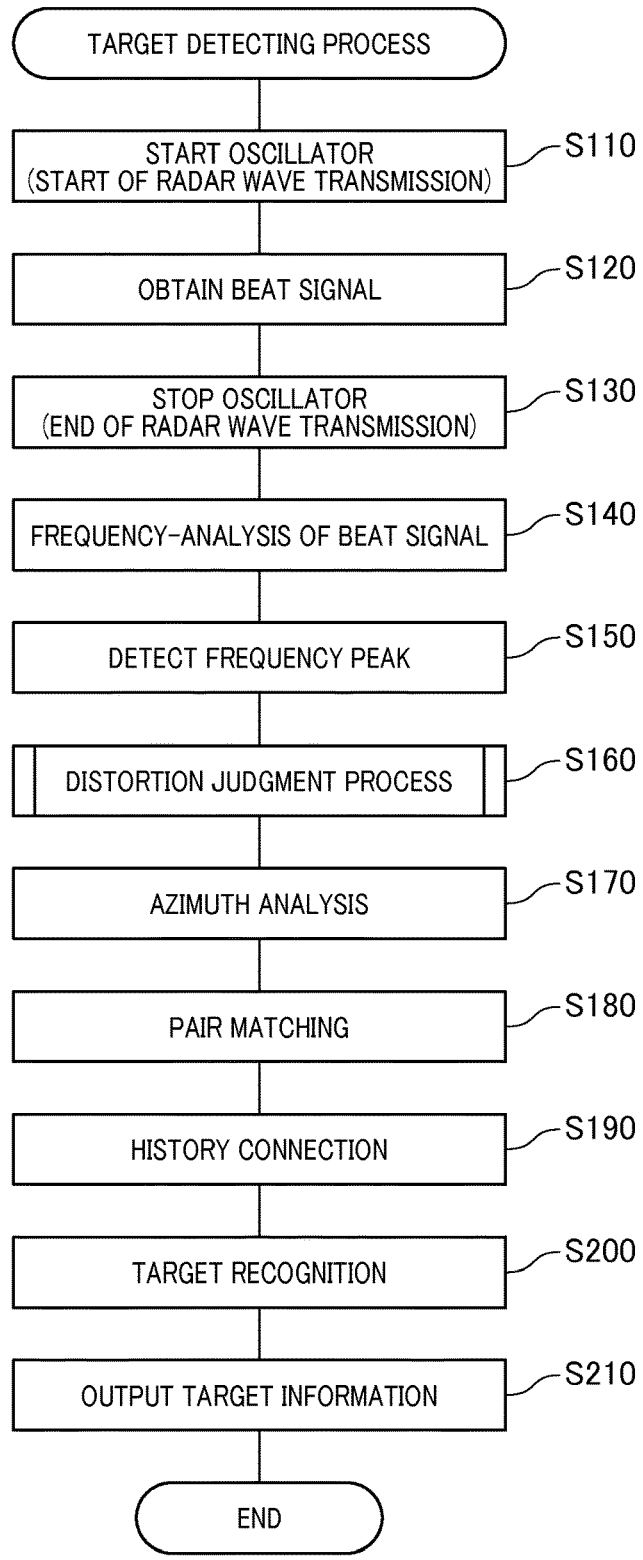
FIG. 2 is a flowchart which shows a procedure of a target detecting process performed by the radar apparatus.

As shown in FIG. 2, when the target detecting process starts, the oscillator 32 is actuated to start transmission of the radar wave (S110). Then, sampling values of the I signal $BT_I$ and the Q signal $BT_Q$ are obtained via the A/D converter 54 (S120). After the necessary sampling values are obtained, the oscillator 32 is stopped to terminate transmission of the radar wave (S130).

Then, complex frequency analysis (in this embodiment, complex FFT process) is performed for the sampling values obtained in S130 so as to obtain power spectrum of a beat signal BT for each of the receiving channels $CH_1$ to $CH_N$ and the rising/falling sections (S140). The power spectrum represents the frequency contained in the beat signal BT and the intensity of each frequency.

Then, a frequency peak in the power spectrum is detected for each of the rising section and the falling section (S150). In a frequency peak detection process performed in S150, an average spectrum is obtained by arithmetically averaging the power spectrums in the respective receiving channels CH with all the receiving channels. Then, in the average spectrum, the frequency which corresponds to a peak point (that is, maximum value) at which the intensity of frequency exceeds a predetermined judgment threshold Th is detected as a frequency peak. In addition to that, the intensity of the frequency in each of the frequency peak is detected in S150.

That is, in S150, each of the frequencies having an intensity of frequency that becomes maximum and the judgment threshold Th or more in the average spectrum are detected as frequency peaks, and the intensity of frequency at the frequency peak is also detected.

Then, on the basis of the frequency peak detected in S150, a distortion judging process is performed so as to judge whether the frequency peak which corresponds to a harmonic wave is due to multiple reflection or due to saturation of incoming wave in the amplifier circuit (S160). The details of the distortion judging process will be described later.

Then, on the basis of the power spectrum obtained in S140, an azimuth analysis is performed so as to estimate an azimuth θ at which a target candidate that is possibly a target is located (S170). In this embodiment, as a method of azimuth analysis, a known MUSIC method for calculating MUSIC spectrum from the power spectrum by using a null point of an antenna having a small half-value angle is used. According to the MUSIC method, the peak point of MUSIC spectrum is an index which indicates the azimuth θ at which the target candidate is located.

Further, a pair matching process is performed so as to match and register the frequency peak obtained from the rising section and the frequency peak obtained from the falling peak which are regarded as corresponding to the radar wave which has been reflected by the same target (S180). Specifically, in this pair matching process, it is judged whether a power difference and an angle difference between the frequency peak in the rising section and the frequency peak in the falling section are within a predetermined acceptable range or not. When both the power difference and the angle difference are within the acceptable range as a result of judgment, those frequency peaks are matched and the matched pair of frequency peaks is registered. Each registered pair of frequency peaks corresponds to the target candidate.

In the pair matching process of this embodiment, a distance from the radar sensor 10 to the target candidate and a relative speed between the target candidate and the own vehicle are calculated for the registered pair of frequency peaks by a known method in the FMCW radar apparatus. Further, in this embodiment, on the basis of the relative speed between the target candidate and the own vehicle and the vehicle speed of the own vehicle, the speed of each target candidate is calculated and whether the target candidate is a stationary object or a moving object is determined. Then, information of the calculated distance and the relative speed (speed) along with the azimuth θ at which the target candidate is located is generated as the target information.

Further, a history connection process is performed so as to calculate a probability of each target candidate (S190). The history connection process is a process for calculating a probability of the target candidate being a target on the basis of the target information (that is, such as distance, speed, azimuth θ) of the target candidate detected in the current measurement cycle (hereinafter, referred to as "current cycle candidate") and the target information of the target candidate detected in the previous measurement cycle (hereinafter, referred to as "previous cycle candidate").

In the history connection process, all the combinations of previous cycle candidate and current cycle candidate (hereinafter, referred to as combination pairs) are estimated, and a predicted value is derived on the basis of the target information which corresponds to the previous cycle candidate in each of the combination pairs. The predicted value contains a position (hereinafter, referred to as a predicted position) and a speed (hereinafter, referred to as a predicted speed) of the target candidate in the current measurement cycle which corresponds to the previous cycle candidate. The predicted value may be derived, for example, by using a Kalman filter or the like. Then, on the basis of the derived predicted position and predicted speed and the position and speed derived from the current cycle candidate, a positional difference and a speed difference between those are calculated. The positional difference is a difference between the position of the current cycle candidate and the predicted position, while the speed difference is a difference between the speed of the current cycle candidate and the predicted speed.

Further, in the history connection process, when the positional difference is smaller than a predetermined reference amount and the speed difference is smaller than a predetermined maximum speed difference, the frequency pair contained in that combination pair is regarded as corresponding to the same target candidate (that is, history connection is present). Then, a count value of a history connection counter for the current cycle candidate is obtained by adding 1 to a count value of the history connection counter for the previous cycle candidate.

Then, an object recognition process is performed so as to recognize a target candidate having a probability of a target which is a specified threshold or more as a confirmed target (S200). Specifically, in the target recognition process in S200, a target candidate is recognized as a confirmed target when the count value of the history connection counter becomes a specified threshold or more.

Further, the target information regarding the target recognized as a confirmed target in the target recognition process is outputted to the drive assist ECU 60 (S210).

Then, the target detecting process for the current measurement cycle is completed and is ready for the next measurement cycle.

<Distortion Judging Process>

Next, the distortion judging process performed in S160 of the target detecting process will be described.

Figure 3:
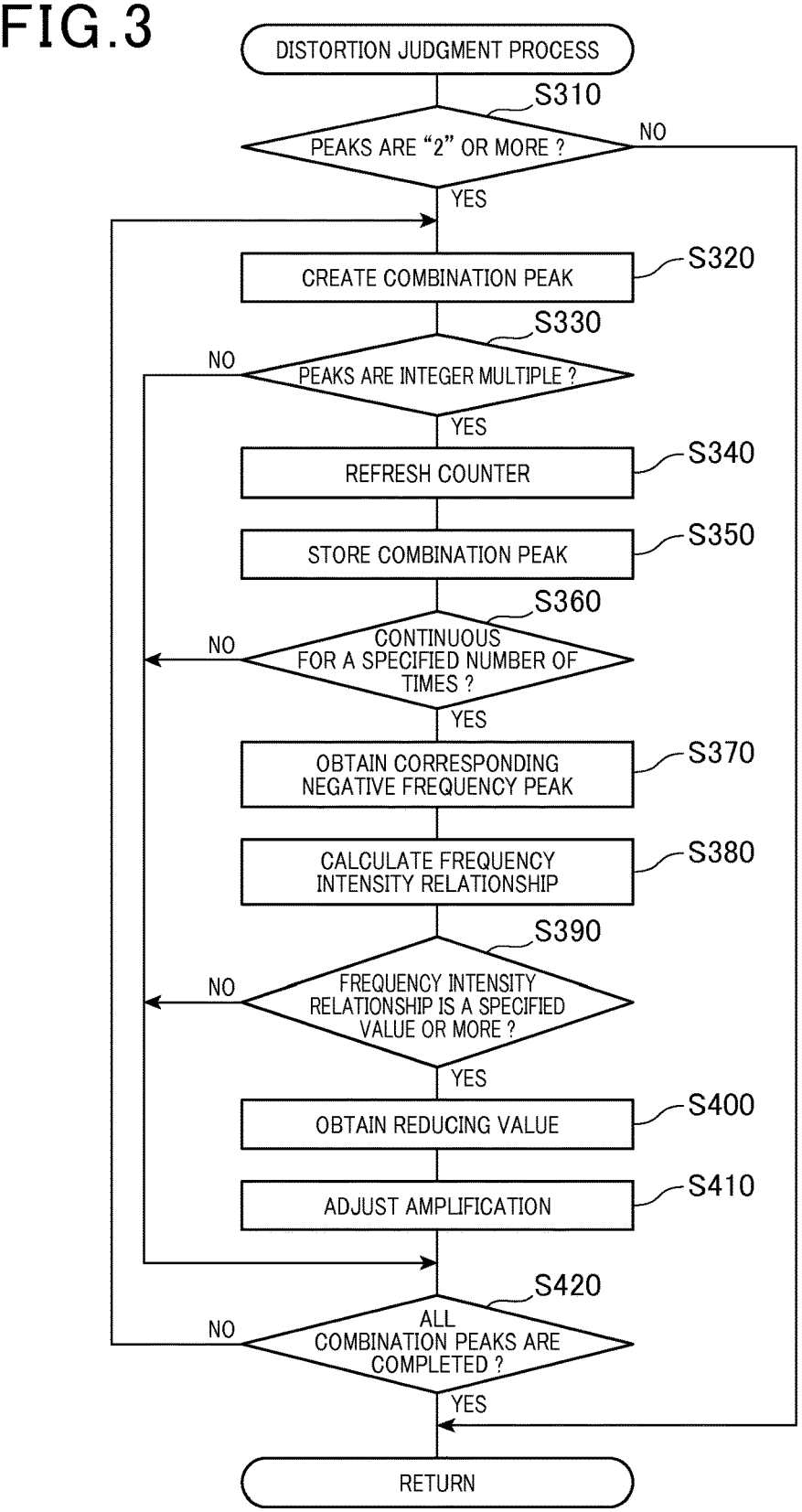
FIG. 3 is a flowchart which shows a procedure of a distortion judging process performed by the radar apparatus.

As shown in FIG. 3, when the distortion judging process starts, it is judged whether two or more frequency peaks are present in a positive frequency domain of the power spectrum which is calculated in S140 (S310). When two or more frequency peaks in the positive frequency domain are not present as a result of judgment at S310 (S310: NO), the distortion judging process is terminated and the process proceeds to S170 of the target detecting process.

On the other hand, when two or more frequency peaks in the positive frequency domain are present as a result of judgment at S310 (S310: YES), two frequency peaks are extracted from all the frequency peaks in the positive frequency domain and a combination (hereinafter, referred to as a combination peak) is generated (S320). Then, it is judged whether one of the two frequency peaks which constitute the generated combination peak is an integer multiple of the other of the frequency peaks (S330). The integer multiple as described herein includes a range that can be regarded as an integer multiple in addition to a complete integer multiple.

When two frequency peaks which constitute the combination peak are in a relationship of integer multiple as a result of judgment at S330 (S330: YES), a high-order number of times counter which corresponds to the combination peak having two frequency peaks which are judged as integer multiple (hereinafter, referred to as a selected combination peak) is incremented by one (S340). The high-order number of times counter is a counter that counts the number of times of the measurement cycle in which the selected combination peak is composed of a frequency peak that corresponds to a fundamental wave and a frequency peak that corresponds to a secondary harmonic wave.

Then, for the selected combination peak, each of the frequency peaks that constitute the selected combination peak and the intensity of the frequency peaks are associated and stored (S350).

Further, it is judged whether the count value of the high-order number of times counter which corresponds to the selected combination peak is a specified number of times or more (S360). When the count value of the high-order number of times counter is a specified number of times or more as a result of the judgment (S360: YES), the process proceeds to S370, which is described later in detail.

On the other hand, when the count value of the high-order number of times counter is lower than a specified number of times as a result of the judgment at S360 (S360: NO), the process proceeds to S420. Further, in the distortion judging process of this embodiment, when two frequency peaks which constitute the combination peak are not in a relationship of integer multiple as a result of judgment at S330 (S330: NO), the process also proceeds to S420.

In S420, combination peaks are generated for all the frequency peaks in the positive frequency domain, and it is judged whether at least the step of S330 is performed or not. If there is an unprocessed combination peak as a result of judgment (S420: NO), the process returns to S320. In S320, a new combination peak is generated, and the process proceeds to S330.

In the following description, "the frequency peak which corresponds to the fundamental wave" and "the frequency peak which corresponds to the secondary harmonic wave" in the selected combination peak are referred to as a primary peak and a secondary peak, respectively.

In S370 which is performed when the count value of the high-order number of times counter is a specified number of times or more, the intensity of frequency of the frequency peak which corresponds to the secondary peak in a negative frequency domain (hereinafter, referred to as a negative secondary peak) is obtained. Further, a frequency intensity relationship that indicates the relationship between the intensity of frequency of the negative secondary peak obtained in S370 and the intensity of frequency of the secondary peak is calculated (S380). The frequency intensity relationship in this embodiment is a ratio of the intensity of frequency of the secondary peak to the intensity of frequency of the negative secondary peak. Further, the frequency intensity relationship is not limited to the ratio of the intensity of frequency, and may be a difference of the intensity of frequency.

Then, it is judged whether the frequency intensity relationship calculated in S380 is a predetermined specified value or more (S390). The specified value in this embodiment is a value which is experimentally obtained as the maximum value of the frequency intensity relationship when the secondary peak is due to multiple reflection. The multiple reflection as described herein is a phenomenon that the radar wave is reflected for a plurality of times (for example, "two" times) between the own vehicle on which the radar sensor 10 is mounted and the preceding vehicle, and the radar wave which has been reflected for a plurality of times is received.

That is, in the multiple reflection, the incoming wave received by the radar sensor 10 includes the incoming wave which has been initially reflected by the preceding vehicle (which corresponds to the fundamental wave; hereinafter, referred to as "fundamental incoming wave") and the incoming wave which has been reflected for a plurality of times between the own vehicle and the preceding vehicle (which corresponds to the secondary harmonic wave; hereinafter, referred to as "secondary incoming wave"). Since the fundamental incoming wave and the secondary incoming wave are independent from each other, the phase of Q signal $BT_Q$ which corresponds to each of the fundamental incoming wave and the secondary incoming wave in the radar sensor 10 is delayed relative to the I signal $BT_I$ by $\pi/2$ [rad].

When the complex frequency analysis is performed for the beat signal in multiple reflection (hereinafter, referred to as a multiple reflection beat signal), as shown in FIG. 4, the primary peak and the secondary peak are detected in the positive frequency domain. However, the frequency peak which corresponds to the primary peak and the frequency peak which corresponds to the secondary peak (that is, negative secondary peak) are not detected in the negative frequency domain since the intensity of frequency of the fundamental incoming wave and the secondary incoming wave in the negative frequency domain are suppressed.

On the other hand, when the signal wave form is saturated due to amplification at the amplifier 44, the phase of Q signal $BT_Q$ of the fundamental wave is shifted (delayed) relative to the I signal $BT_I$ of the fundamental wave by $\pi/2$ [rad], while the phase of Q signal $BT_Q$ of the secondary harmonic wave is shifted (delayed) to the I signal $BT_I$ of the secondary harmonic wave by $\pi$ [rad].

Accordingly, in the beat signal based on the signal wave form saturated by amplification in the amplifier (hereinafter, referred to as a saturated beat signal), the intensity of frequency of the fundamental wave in the negative frequency domain is suppressed, while the intensity of frequency of the secondary harmonic wave in the negative frequency domain is not suppressed.

Accordingly, when the complex frequency analysis is performed for the saturated beat signal, as shown in FIG. 5, the primary peak and the secondary peak are detected in the positive frequency domain, and, although the frequency peak which corresponds to the primary peak is not detected in the negative frequency domain, the frequency peak which corresponds to the secondary peak (that is, the negative secondary peak) is detected.

Accordingly, when the frequency intensity relationship is the specified value or more (S390: YES) as a result of judgment at S390, the secondary peak is determined to be generated due to saturation of the incoming wave by amplification at the amplifier 44, and a reducing value that indicates a changing amount of the amplification factor $\alpha$ of the amplifier 44 is obtained (S400). In obtaining the reducing value at S400, as shown in FIG. 6, a difference between the intensity of frequency of the secondary peak and the judgment threshold Th is calculated. Then, the reducing value is obtained by multiplying the difference with a multiplying factor set to be larger than 0 and smaller than 1 (for example, "½").

Then, the change command SoC is outputted to the amplifier 44 so that the amplification factor $\alpha$ is decreased by the amount of the reducing value obtained at S400 (S410). When the change command SoC is outputted, the amplifier 44 decreases the amplification factor $\alpha$ by the amount of reducing value in order to prevent occurrence of clipping. Then, the process proceeds to S420.

As a result of judgment at S390, when the frequency intensity relationship is lower than the specified value (S390: NO), the secondary peak is determined to be generated due to multiple reflection, and the process proceeds to S420 without performing S400 and S410.

In S420, combination peaks are generated for all the frequency peaks in the positive frequency domain, and it is judged whether at least the step of S330 is performed or not. If there is an unprocessed combination peak as a result of the judgment (S420: NO), the process returns to S320. In S320, a new combination peak is generated, and the process proceeds to S330.

If there is no unprocessed combination peak as a result of judgment at S420 (S420: NO), the distortion judging process is terminated and the process proceeds to S170 of the target detecting process.

That is, in the distortion judging process of this embodiment, when two frequency peaks which constitute the combination peak are an integer multiple on a continual basis during the measurement cycles of a specified number of times, the combination peak is determined to be composed of a frequency peak which corresponds to the fundamental wave (that is, primary peak) and a frequency peak which corresponds to a harmonic wave (that is, secondary peak).

When the combination peak is composed of the primary peak and the secondary peak as described above, the ratio of the intensity of frequency of the secondary peak to the intensity of frequency of the negative secondary peak is obtained as the frequency intensity.

When the frequency intensity is a specified value or more, the secondary peak is determined to be generated due to saturation of the incoming wave by amplification in the amplifier 44, and the change command SoC is outputted to the amplifier 44 to decrease the amplification factor $\alpha$. The decreasing amount of the amplification factor $\alpha$ in the amplifier 44 is a value obtained by multiplying the difference between the intensity of frequency of the secondary peak and the judgment threshold Th by ½.

On the other hand, when the frequency intensity relationship is lower than a specified value, the secondary peak is determined to be generated due to multiple reflection.

Effect of Embodiment

As described above, since the intensity of frequency of the fundamental incoming wave and the secondary incoming wave in the negative frequency domain are suppressed in the case of multiple reflection, the frequency peaks which correspond to the primary peak and the secondary peak are not detected in the negative frequency domain in the radar sensor 10. Accordingly, when the secondary peak is generated due to multiple reflection, the frequency intensity relationship is less than a specified value.

On the other hand, when the signal waveform is saturated due to amplification in the amplifier 44, the intensity of frequency of the fundamental wave in the negative frequency domain is suppressed, while the intensity of frequency of the secondary harmonic wave in the negative frequency domain is not suppressed. Accordingly, when the secondary peak is generated due to saturation of the signal waveform by amplification in the amplifier 44, the frequency intensity relationship is a specified value or more.

As described above, according to the radar sensor 10, it is possible to judge whether the secondary peak is due to saturation of the incoming wave by amplification in the amplifier 44 (that is, saturation distortion) or due to multiple reflection. Particularly, according to the radar sensor 10, the judgment accuracy can be improved.

Further, according to the radar sensor 10, when the secondary peak is generated due to saturation of the signal waveform by amplification in the amplifier 44, the amplification factor α of the amplifier 44 is decreased.

As a result, according to the radar sensor 10, the frequency peak due to the saturation distortion can be prevented from being detected in the subsequent measurement cycles.

Particularly, according to the radar sensor 10, since the decreasing amount of the amplification factor α in the amplifier 44 is a value obtained by multiplying the difference between the intensity of frequency of the secondary peak and the judgment threshold Th by ½, it is possible to prevent unnecessary decrease of the amplification factor α.

Further, in the distortion judging process of this embodiment, when the number of times that two frequency peaks which constitute the combination peak are an integer multiple on a continual basis for less than a specified number of times, the combination peak is not determined to be composed of the frequency peak which corresponds to the fundamental wave and the frequency peak which corresponds to the harmonic wave, and the steps of S370 to S410 of the distortion judging process are not performed. According to the radar sensor 10, it is possible to prevent unnecessary decrease of the amplification factor α.

As a result, according to the radar sensor 10, it is possible to prevent failure of detection of the frequency peak which should be detected in the subsequent measurement cycles.

Therefore, according to the radar sensor 10, the detection accuracy of target can be improved.

Other Embodiments

While the embodiment of the present disclosure has been described, the present disclosure is not limited to the above embodiments and may be implemented in various embodiments without departing from the spirit of the present disclosure.

For example, although two frequency peaks are combined to generate a combination peak in S320 of the distortion judging process in the embodiment, the number of frequency peaks to be combined to generate a combination peak is not limited thereto. That is, the number of frequency peaks to be combined to generate a combination peak may be three or more, and any number larger than two is possible.

In this case, however, it is necessary to judge whether each of the frequency peaks that constitute the combination peak are in a relationship of integer multiple or not in S330 of the distortion judging process.

Further, although the judgment threshold Th shown in FIG. 6 remains the same for all the frequency domains, the value of the judgment threshold Th is not limited thereto. For example, the value may be larger with decrease of frequency and may be smaller with increase of frequency.

Further, the above embodiment having a configuration partially omitted may also be an embodiment of the present disclosure as long as it can solve the problem. In addition, an embodiment formed by combining the above embodiment and a variation as appropriate may also be an embodiment of the present disclosure. All the embodiments which could be conceived of without departing from the essence of the present invention as defined in claims may also be an embodiment of the present disclosure.

Reference numbers used in the description in the above embodiments are also used as appropriate in the accompanying claims. Those are used for facilitating the understanding of the invention defined in claims, and is not intended to limit the technical scope of the claims.

REFERENCE SIGNS LIST

1 . . . drive assist system
10 . . . radar sensor
32 . . . oscillator
33 . . . amplifier
34 . . . divider
36 . . . transmission antenna
40 . . . receiving antenna section
41 . . . array antenna
42 . . . receiving switch
44 . . . amplifier
46 . . . mixer
48 . . . phase shift circuit
50 . . . mixer
52 . . . filter
54 . . . A/D converter
56 . . . signal processing section
60 . . . drive assist ECU

The invention claimed is:

1. A radar apparatus comprising:
a transmitting means for transmitting a radar wave which is frequency-modulated along a time axis in a specified cycle;
a receiving means for receiving an incoming wave which is a reflected wave of the radar wave transmitted by the transmitting means, and amplifying the received incoming wave with an amplifier;
an I signal generating means for generating an I signal which is a real number component of a beat signal, the I signal being generated by mixing the incoming wave received and amplified by the receiving means with the radar wave transmitted by the transmitting means;
a Q signal generating means for generating a Q signal which is an imaginary number component of a beat signal, the Q signal being generated by mixing the incoming wave received and amplified by the receiving means with the radar wave transmitted by the transmitting means, a phase of the radar wave to be mixed with the incoming wave being shifted by π/2 [rad];
a peak detecting means for performing complex frequency analysis of the I signal generated by the I signal generating means and the Q signal generated by the Q signal generating means, thereby detecting a frequency peak corresponding to a frequency component of which the intensity thereof peaks at a local maximum in a positive frequency domain and a negative frequency domain of the complex frequency analysis;
a target detecting means for detecting the frequency peak detected by the peak detecting means as a target that has reflected the radar wave; and
a distortion judging means for at least judging whether the frequency peak represents a saturation distortion, which is a signal saturated in the amplifier, based on a comparison of intensities of frequency peaks detected between the positive frequency domain and the negative frequency domain in the complex frequency analysis, the frequency peaks to be compared between the positive and negative frequency domains corresponding to the same frequency component,
wherein
the distortion judging means includes a high-order peak judging means for judging whether a secondary peak is present in the frequency peaks detected in the positive frequency domain, the secondary peak corresponding to a secondary harmonic wave of a frequency component having a specific fundamental frequency; and
when the high-order peak judging means judges that the secondary peak is present, the high-order peak judging means judges that the secondary peak is due to the saturation distortion if the intensity of a frequency peak in the negative frequency domain, which corresponds to the secondary peak detected in the positive frequency domain, is equal to or greater than a predetermined specified ratio relative to the intensity of the secondary peak.

2. The radar apparatus according to claim 1, wherein the distortion judging means judges, when the secondary peak is present as a result of judgment by the high-order peak judging means, that the secondary peak is due to multiple reflection if the intensity of the frequency peak in the negative frequency, which corresponds to the secondary peak, is lower than the predetermined specified ratio relative to the intensity of the secondary peak.

3. The radar apparatus according to claim 1, further comprising:
an amplification control means for controlling an amplification factor of the amplifier, which is capable of changing the amplification factor thereof, in response to a command from the amplification control means,
wherein the amplification control means transmits the command to the amplifier to decrease the amplification factor, thereby preventing clipping of the amplifier, when the distortion judging means detects the frequency peak due to the saturation distortion.

4. The radar apparatus according to claim 3, wherein
the peak detecting means detects, as a result of the complex frequency analysis, each frequency component in which the intensity peaks at a local maximum and is equal to or greater than a specified judgment threshold, the each frequency component being detected as the frequency peak, and
the amplification control means determines a value to be used for decreasing the amplification factor, such that a difference between the intensity of the frequency peak judged as the saturation distortion and the specified judgment threshold means is multiplied by a factor which is larger than 0 and smaller than 1.

* * * * *